(12) United States Patent
Shinoda et al.

(10) Patent No.: US 6,377,816 B1
(45) Date of Patent: Apr. 23, 2002

(54) WIRELESS COMMUNICATION DEVICE CAPABLE OF OPERATING UNDER DIFFERENT COMMUNICATION PROTOCOLS

(75) Inventors: Koji Shinoda, Chiryu; Hiroaki Kuraoka, Toyota; Yoshiyuki Kawase, Anjo, all of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/457,886

(22) Filed: Dec. 10, 1999

(30) Foreign Application Priority Data

Feb. 8, 1999 (JP) .......................................... 11-029695

(51) Int. Cl.[7] ................................................. H04B 1/36
(52) U.S. Cl. ...................................... 455/553; 455/575
(58) Field of Search ........................... 455/78, 80, 550, 455/552, 553, 556, 575, 90

(56) References Cited

U.S. PATENT DOCUMENTS 5,845,215 A * 12/1998 Henry et al. ................. 455/553

6,032,053 A * 2/2000 Schroeder et al. ........... 455/553

FOREIGN PATENT DOCUMENTS

JP      A-6-224834      8/1994
JP      A-7-177231      7/1995

* cited by examiner

Primary Examiner—Thanh Cong Le
(74) Attorney, Agent, or Firm—Fish & Richardson P.C.

(57) ABSTRACT

A PDC/PHS phone has both PDC communication function and PHS communication function. The PDC/PHS phone receives a call from a PHS phone through a PHS communication network when it is in the communication with a PDC phone through a PDC communication network. The PDC/PHS phone changes its connection to the PHS communication network to transmit to the PHS phone a fixed answer message indicating that it is in the middle of communication with the PDC phone. The fixed answer message may be transmitted automatically or in response to a predetermined key operation of a user of the PDC/PHS phone. The communication with the PDC phone may be continued irrespective of the call from the PHS phone, or a new communication with the PHS phone may be enabled in response to another predetermined key operation of the user while holding the communication with the PDC phone to be resumed later.

8 Claims, 6 Drawing Sheets

WIRELESS COMMUNICATION DEVICE CAPABLE OF OPERATING UNDER DIFFERENT COMMUNICATION PROTOCOLS

CROSS REFERENCE TO RELATED APPLICATION

This application relates to and incorporates herein by reference Japanese Patent Application No. 11-29695 filed on Feb. 8, 1999.

BACKGROUND OF THE INVENTION

1. Field of the Invention

The present invention relates to wireless communication devices capable of communicating through wireless communication systems which operate under different communication protocols.

2. Related Art

Various kinds of wireless communication devices are used for mobile communications. The devices include, for instance, personal digital cellular (PDC) type phones such as a cellular phone and a car phone, and personal handy phone (PHS) type devices developed as the second generation cordless phone.

The PDC phone is capable of providing communication services over a wide area because the service area of its base station (BS) is from 1.5 kilometers to several kilometers (macro cell) in radius, and is capable of providing communication services even when phone users are moving at high speeds. The cellular phones and the car phones consume more electric power. On the contrary, the PDC phone provides communication services over a limited area because the service area of its cell station (CS) is from 100 meters to several hundred meters (micro cell) and the phones consume less electric power. The PDC phone is not capable of providing its services when phone users are moving at high speeds.

New type of cellular phones which are compatible with both the PDC phone and the PHS phone are proposed so that such phones are operable under both of the PDC communication protocol and the PHS communication protocol. This requires new wireless communication service system operators which enable communications under both of the PDC system and the PHS system in addition to the conventional system operators which provide communication services of only one of the PDC system and the PHS system.

If a system operator provides communication services of both systems, a single phone number may be assigned to a cellular phone having both of the PDC communication function and the PHS communication function as a PDC phone number to be used under the PDC system and a PHS phone number to be used under the PHS system. Alternatively, a PDC phone number and a PHS phone number may be managed by bringing the numbers into proper correlation even if the numbers are different from each other. As a result, it is possible for such a system operator to control communication switching operations in the PDC system and in the PHS system in a unified manner.

If the communication services under the PDC system and the PHS system are separately provided by different system operators, on the other hand, it is impossible to assign the single phone number to the cellular phone having both of the PDC communication function and the PHS communication function as the PDC phone number and the PHS phone number. It is also impossible to correlate the PDC phone number and the PHS phone number. Thus, it is impossible to control the communication switching operations in both systems in a unified manner.

It is assumed that no operators provide communication services of both systems, and that cellular phones A, B and C are operable under both PDC and PHS systems, only PDC system and only PHS system. It is also assumed that a user of the phone C inputs the PHS phone number of the phone A to send a call signal to the phone A through a PHS communication network in the PHS system, while the phones A and B are in the communication state through a PDC communication network in the PDC system. The PHS communication network is incapable of checking whether the phone A is in communication with the phone B. It is therefore impossible to transmit to the phone C an answer message indicating that the phone A is in the communication state. Thus, the user of the phone C is not capable of checking the state of the phone A to which the call is addressed.

SUMMARY OF THE INVENTION

It is therefore an object of the present invention to provide a wireless communication device which is capable of notifying a communication state to a caller upon receipt of a phone call.

A compatible wireless communication device has both communication functions of different communication protocols. The device receives a call from one device through one communication network when it is in the communication with another device through another communication network operating under a protocol different from that of the one communication network. The compatible device changes its connection to the one communication network to transmit to the one device a fixed answer message indicating that it is in the middle of communication with the other device.

The fixed answer message may be transmitted automatically or in response to a predetermined key operation of a user of the compatible device. The existing communication with the other device may be continued irrespective of the call from the one device, or a new communication with the one device may be enabled in response to another predetermined key operation of the user while holding the communication with the other device to be resumed later.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to its presently preferred exemplary embodiments in which a cellular phone is made compatible with both a personal digital cellular (PDC) type communication system and a personal handy phone system (PHS) type communication system.

First Embodiment

Figure 1:
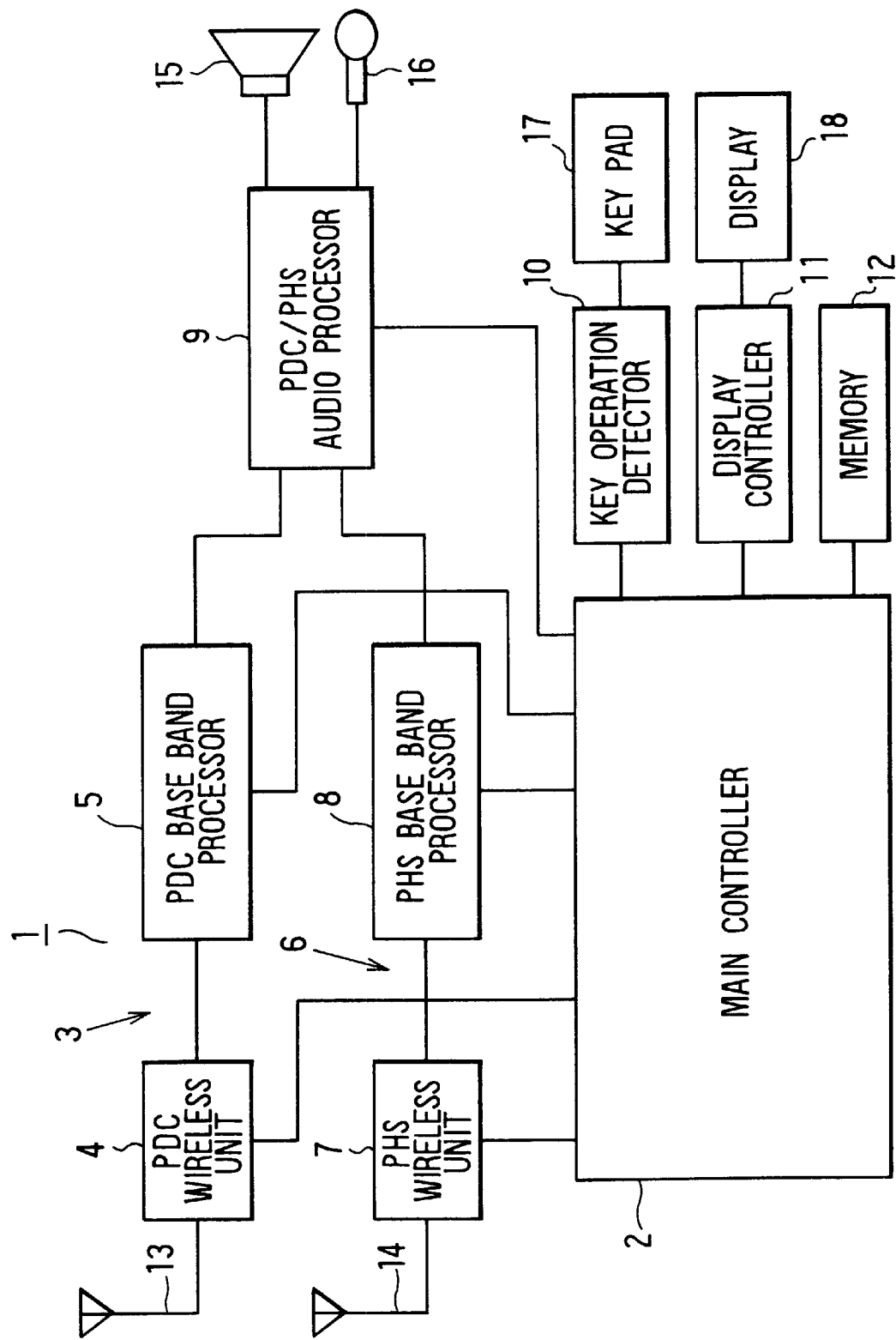
FIG. 1 is a block diagram showing a wireless communication device used in a wireless communication system according to a first embodiment of the present invention.

Referring first to FIG. 1, a PDC/PHS phone 1 has a main controller 2 primarily comprising a microcomputer. The main controller 2 is connected with a PDC communication part 3 including a PDC wireless unit 4 connected to an antenna 13 and a PDC base band processor 5, a PHS communication part 6 including a PHS wireless unit 7 connected to an antenna 14 and a PHS base band processor 8, and a PDC/PHS audio processor 9 connected to a speaker 15 and a microphone 16. The main controller 2 is also connected to a key operation detector 10 connected to a key pad 17, a display controller 11 connected to a display 18, and a memory 12.

The PDC wireless unit 4 of the PDC communication part 3 has a receiver circuit, a demodulator circuit and the like. When the PDC antenna 13 receives a radio signal in the 1.5 GHz frequency band, the wireless unit 4 performs signal receiving and demodulating processes to produce a reception signal to the base band processor 5.

The PDC wireless unit 4 also has a modulator circuit, a d.c./a.c. modulator circuit, a power amplifier circuit and the like. When a transmission signal is applied from the PDC base band processor 5, the wireless unit 4 performs a modulation, d.c./a.c. modulation and amplification of the transmission signal to transmit it from the PDC antenna 13 as a radio signal.

The PDC base band processor 5 is constructed as a TDMA (time-divided multiple access) control circuit. When the reception signal is applied, the PDC base band processor 5 performs the TDMA processing on the reception signal to produce a processed reception signal to the PDC/PHS audio processor 9. Further, the PDC base band processor 5 performs the TDMA processing on the transmission signal applied from the PDC/PHS audio processor 9 to produce a processed transmission signal to the wiring nit 4.

The PHS wireless unit 7 of the PHS communication unit 6 is basically constructed in the same manner as the PDC wireless unit 4. However, the PHS wireless unit 7 is constructed to process the reception signal and the transmission signal in the 1.9 GHz frequency band which complies with the PHS system communication protocol, while the PDC wireless unit 4 is constructed to process the reception signal and the transmission signal in the 1.5 GHz frequency band which complies with the PDC system communication protocol.

That is, the PHS wireless unit 7 also has a receiver circuit, a demodulator circuit and the like. When the PHS antenna 14 receives the radio signal in the 1.9 GHz frequency band, the wireless unit 7 performs signal receiving and demodulating processes to produce a reception signal to the base band processor 8.

The PHS wireless unit 7 also has a modulator circuit, a d.c./a.c. modulator circuit, a power amplifier circuit and the like. When a transmission signal is applied from the PHS base band processor 8, the wireless unit 7 performs a modulation, d.c./a.c. modulation and amplification of the transmission signal to transmit it from the PHS antenna 14 as a radio signal.

The PHS base band processor 8 of the PHS communication unit 6 is basically constructed in the same manner as the PDC base band processor 5. However, the PHS base band processor 8 is constructed to process the reception signal and the transmission signal in the 1.9 GHz frequency band which complies with the PHS system communication protocol, while the PDC base band processor 5 is constructed to process the reception signal and the transmission signal in the 1.5 GHz frequency band which complies with the PDC system communication protocol.

That is, the PHS base band processor 8 is also constructed as a TDMA (time-divided multiple access) control circuit. When the reception signal is applied from the PHS wireless unit 7, the PHS base band processor 8 performs the TDMA processing on the reception signal to produce a processed reception signal to the PDC/PHS audio processor 9. Further, the PHS base band processor 8 performs the TDMA processing on the transmission signal applied from the PDC/PHS audio processor 9 to produce a processed transmission signal to the wireless unit 7.

The PDC/PHS audio processor 9 has a digital signal processor circuit, an audio interface circuit and the like. When the reception signal is applied from the PDC base band processor 5 or the PHS base band processor 8, the audio processor 9 performs voice decoding processing, D/A conversion processing and the like on the applied reception signal to produce the processed reception signal to the speaker 15.

Further, when a voice signal is applied from the microphone 16, the PDC/PHS audio processor 9 also performs A/D conversion processing, voice coding processing and the like on the applied voice signal to produce the transmission signal to the PDC base band processor 5 or the PHS base band processor 8.

In the above PDC/PHS phone 1, the main controller 2 controls the PDC communication part 3 (PDC wireless unit 4 and PDC base band processor 5) so that a message included in the reception signal is produced from the speaker 15 when the PDC antenna 13 receives the radio signal in the 1.5 GHz frequency band, and a radio signal in the 1.5 GHz frequency band is transmitted from the PDC antenna 13 when a message is input through the microphone 16.

Further, the main controller 2 controls the PHS communication part 6 (PHS wireless unit 7 and PHS base band processor 8) so that a message included in the reception signal is produced from the speaker 15 when the PHS antenna 14 receives the radio signal in the 1.9 GHz frequency band, and a radio signal in the 1.9 GHz frequency band is transmitted from the PHS antenna 14 when a message is input through the microphone 16.

The main controller 2 further controls the PDC/PHS audio processor 9 so that the audio processor 9 produces a message signal in response to a control signal applied from the main controller 2. Thus, the speaker 15 produces messages in audible sound in response to message signals from the audio processor 9.

The key pad 17 has various keys (buttons) for turning on or off power, starting communication, ending communication, inputting numbers 0 to 9, and other functions. When the key pad 17 is operated by a user, the key operation detector 10 outputs detection signals to the main controller 2 in correspondence with the operated keys. The main controller 2 performs corresponding processing in response to the detection signals.

The display 18 has a liquid crystal display (LCD) panel. The display controller 12 drives the display 18 to display messages thereon in response to display control signals from the main controller 2.

The memory 12 stores therein fixed answer messages such as "It is in communication now. Please call again later." Or "It is in communication now. Please leave a message." The memory 12 produces fixed message signals to the main controller 2 in response to request signals from the main controller 2. The main controller 2 produces a transmission signal including the fixed message included in the fixed message signal applied from the memory 12 and controls the PDC communication part 3 or the PHS communication part 6 to transmit the fixed message.

The memory 12 also stores messages included in the reception signals received by the PDC communication part 3 or the PHS communication part 6 thereby to operate as an answering phone.

Figure 2:
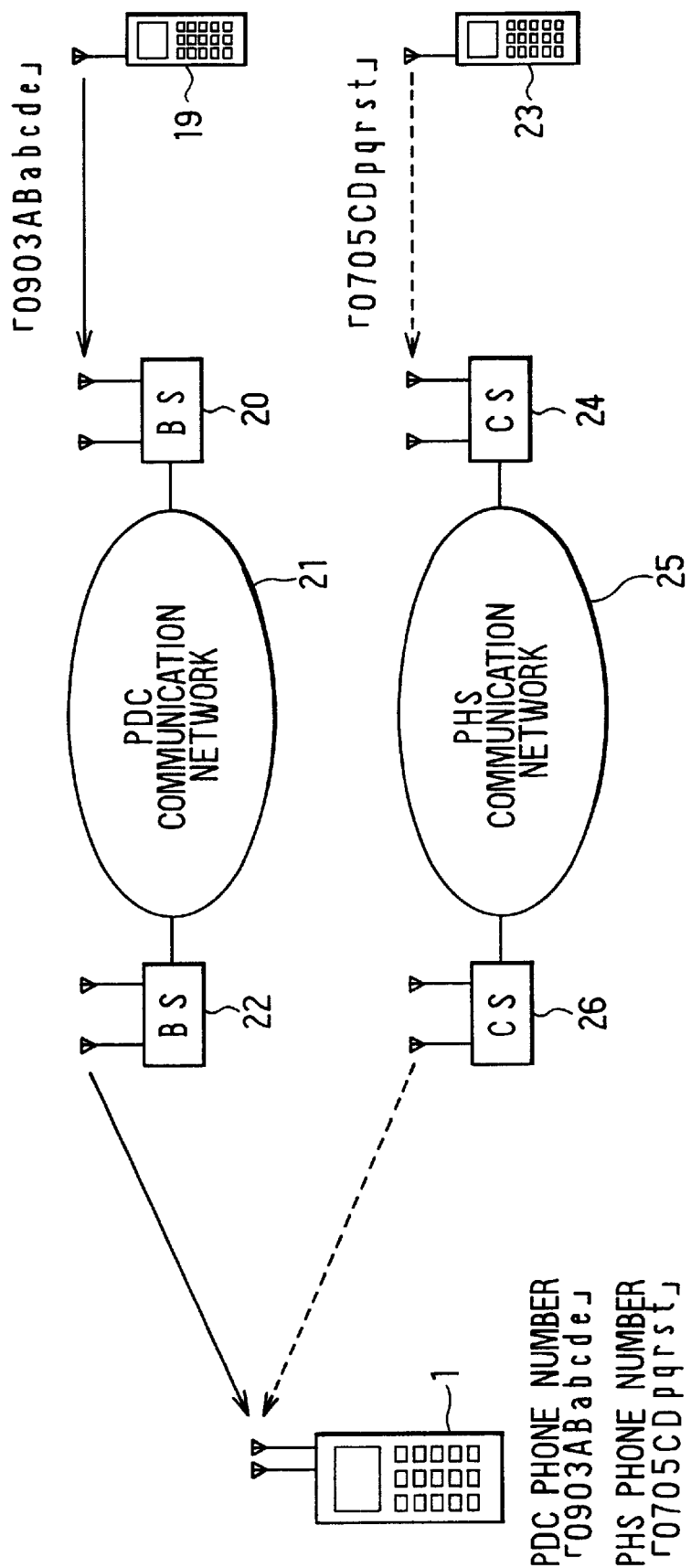
FIG. 2 is a schematic diagram showing a communication network in the wireless communication system of the first embodiment.

The PDC/PHS phone 1 is used in different wireless communication systems, that is, PDC type system and PHS type system, as shown in FIG. 2. It is assumed here that the communication systems are provided by different operators independently from each other. Further, it is assumed that the PDC/PHS phone 1 is compatible with both communication systems. That is, the PDC/PHS phone 1 is assigned with the following two phone numbers, one being a PDC phone number for use in the PDC type communication system and the other being a PHS phone number for use in the PHS type communication system.

PDC phone number : 0903Ababcde

PHS phone number : 0705CDpqrst

Here, "0903" is an identification code which indicates that the phone number is for the PDC type system, while "0705" is an identification code which indicates that the phone number is for the PHS type system. The code for the PDC type system may also be "0901", "0902", "0904" or "0905" which are used in practice, and the code for the PHS system may also be "0706" which is used in practice.

"AB" is an identification code which comprises a two-digit number assigned to indicate an operator of the PDC type communication system, while "CD" is an identification code which comprises a two-digit number assigned to indicate an operator of the PHS type communication system. Further, "abcde" and "pqrst" are five-digit numbers assigned to each user of the PDC/PHS phone 1.

As shown with solid lines in FIG. 2, when the user of the PDC phone 19 inputs the PDC phone number "0903ABabcde" of the PDC/PHS phone 1, the PDC phone 19 transmits the radio signal corresponding to the input phone number to a base station (BS) 20 which in turn transmit it to a PDC communication network 21. The PDC network 21 executes a switching operation in response to the received signal and transmits it to the PDC/PHS phone 1 through a base station 22. The PDC/PHS phone 1 thus receives a call from the PDC phone 19 though the PDC communication network 21.

As shown with dotted lines in FIG. 2, when the user of the PHS phone 23 inputs the PHS phone number "0705CDpqrst" of the PDC/PHS phone 1, the PHS phone 23 transmits the radio signal corresponding to the input phone number to a cell station 24 which in turn transmit it to a PHS communication network 25. The PHS network 25 executes a switching operation in response to the received signal and transmits it to the PDC/PHS phone 1 through a cell station 26. The PDC/PHS phone 1 thus receives a call from the PHS phone 23 though the PHS communication network 25.

Although not shown in FIG. 2, it is to be noted that the PDC network 21 and the PHS network 25 are connected to a public communication networks such as a public switched telephone network (PSTN) and an integrated services digital network (ISDN), and other communication networks which other communication operators provide.

Figure 3:
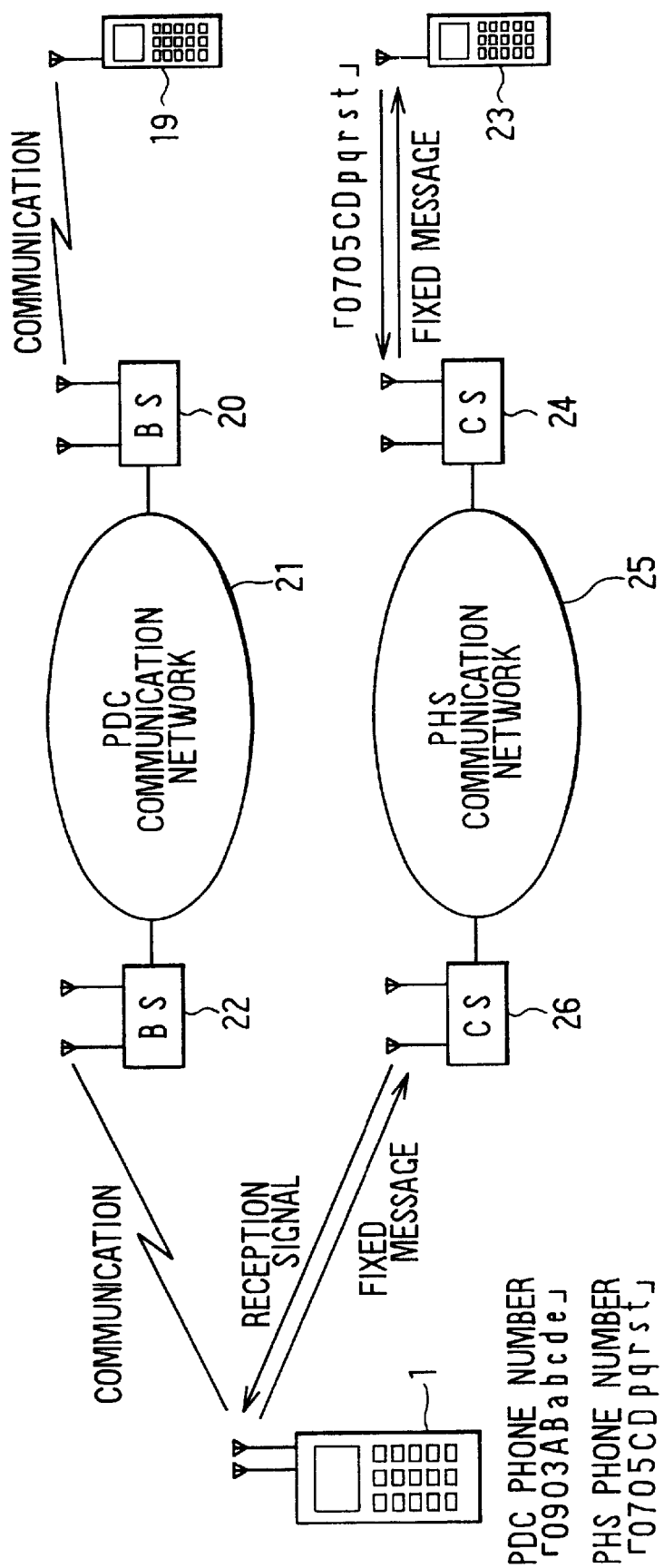
FIG. 3 is a schematic diagram showing an operation of the communication system of the first embodiment.
Figure 4:
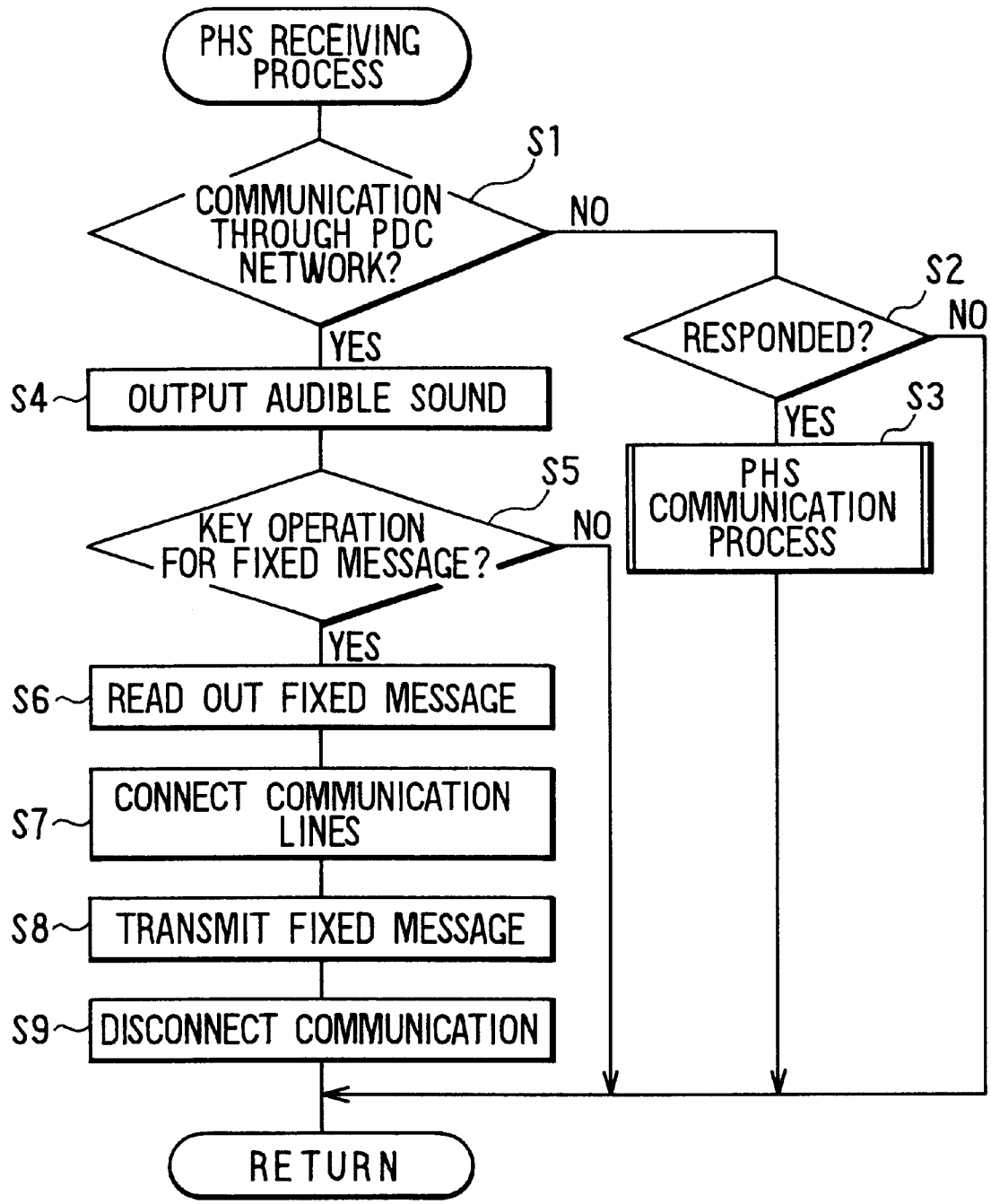
FIG. 4 is a flow diagram showing a communication control program of the communication device shown in FIG. 1.

The main controller 2 of the PDC/PHS phone 1 is programmed to operate in both PDC system and PHS system. For instance, the main controller 2 is programmed to operate as shown in FIG. 3 in the case that the PDC/PHS phone 1 is called from the PHS phone 23 through the PHS network 25. That is, the main controller 2 executes the process shown in FIG. 4.

When the user of the PHS phone 23 inputs the PHS phone number "0705CDpqrst" of the PDC/PHS phone 1, the PHS phone 23 transmits the input signal to the PHS network 25 through the cell station 24. The PHS network 25 responsively performs the switching operation and transmits the signal to the PDC/PHS phone 1 through the cell station 26. The main controller 2 executes the process (PHS receiving process) of FIG. 4 upon receiving the signal from the PHS network 25.

The controller 2 first checks at step S1 whether the PDC/PHS phone 1 is connected to the PDC network 21, that is, it is in the state of communication with another phone such as the PDC phone 19 through the PDC network 21.

If the check result at step S1 is NO indicating that the PDC/PHS phone 1 is not in the communication through the PDC network 21, the controller 2 checks at step S2 whether the user of the PDC/PHS phone 1 has already responded to the call from the PHS phone 23. If the check result at step S2 is YES, the controller 2 executes a PHS communication process at step S3.

If the check result at step S1 is YES indicating that the PDC/PHS phone 1 is in the communication through the PDC network 21, the controller 2 produces the control signal to the PDC/PHS audio processor 9 at step S4 so that the speaker 15 responsively produces an audible sound at a fixed frequency even if the PDC/PHS phone 1 is in the middle of communication with the PDC phone 19 through the PDC network 21.

Thus, the user of the PDC/PHS phone 1 is enabled to recognize that he has received another call through the PHS network 25. The audible sound produced from the speaker 15 in this instance is preferably different from one which is produced when a call is received from the PHS network 25 under the condition that the PDC/PHS phone 1 is not in communication with other phones, that is, the PDC/PHS phone 1 is in a wait condition.

The controller 2 then checks at step S5 whether the user of the PDC/PHS phone 1 responsively operates some keys, for instance, predetermined combination of a function key and numerical key on the key pad 17, to send back the fixed message. If the check result at step S5 is YES indicative of the key operation, the controller 2 produces the message request signal to the memory 12 and reads out at step S6 the fixed message such as "It is in communication now. Please call again later."

The controller 2 produces at step S7 the control signal to the PHS communication part 6 to transmit the fixed message so that it is connected to the PHS phone 23 through the PHS network 25. The controller 2 then transmits the fixed message at step S8 to the PHS phone 23 through the PHS network 25. The controller 2 finally produces at step S9 the control signal to the PHS communication part 6 to disconnect the PDC/PHS phone 1 from the PHS network 25.

Thus, when the PDC/PHS phone 1 receives a call from the PHS phone 23 through the PHS network 25 in the course of its communication with another phone such as the PDC phone 19 through the PDC network 21, the PDC/PHS phone 1 is connected to the PHS network 25 for a while to send the fixed message to the PHS phone 23. As a result, the user of the PHS phone 23 is enabled to recognize that the PDC/PHS phone 1 to which the call is made is in communication.

Although not discussed, the PDC/PHS phone 1 is programmed to be connected to the PDC network 21 for a while to send the fixed message to the PDC phone 19 in the similar manner as explained above, when the PDC/PHS phone 1 receives a call from the PDC phone 19 through the PDC network 21 in the course of its communication with another phone such as the PHS phone 23 through the PHS network 25.

The fixed message is not limited to the above example, but may be combined with an answering service function. For instance, the message may be "It is in communication now. Please leave a message." In this instance, the PDC/PHS phone 1 should be disconnected from the PHS network 25 after the PHS phone 23 issues a message and the PDC/PHS phone 1 stores it in the memory 12.

The PDC/PHS phone 1 may also be so programmed that it produces no audible sounds upon receipt of a call in the middle of communication with another phone, that is, it automatically transmits the fixed message to a caller without checking user's operation on the keys.

Second Embodiment

Figure 5:
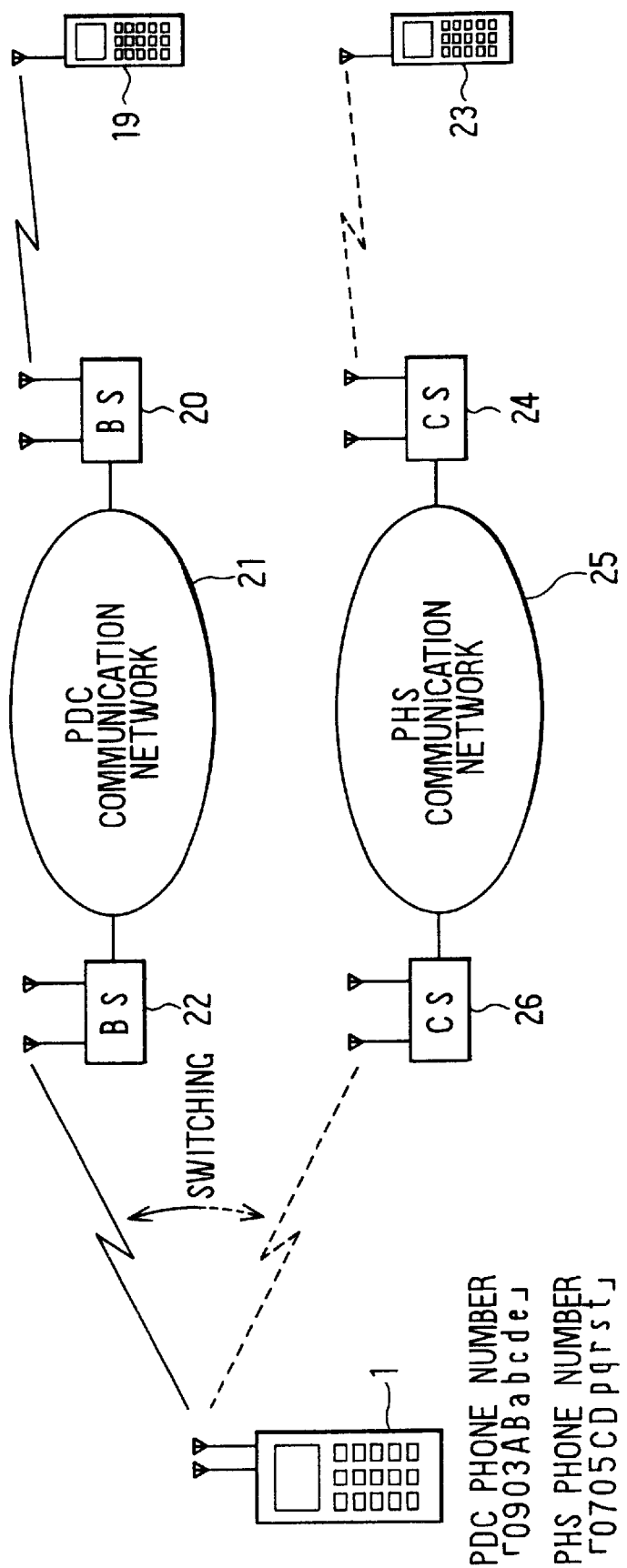
FIG. 5 is a schematic diagram showing an operation of a communication system according to a second embodiment of the present invention.
Figure 6:
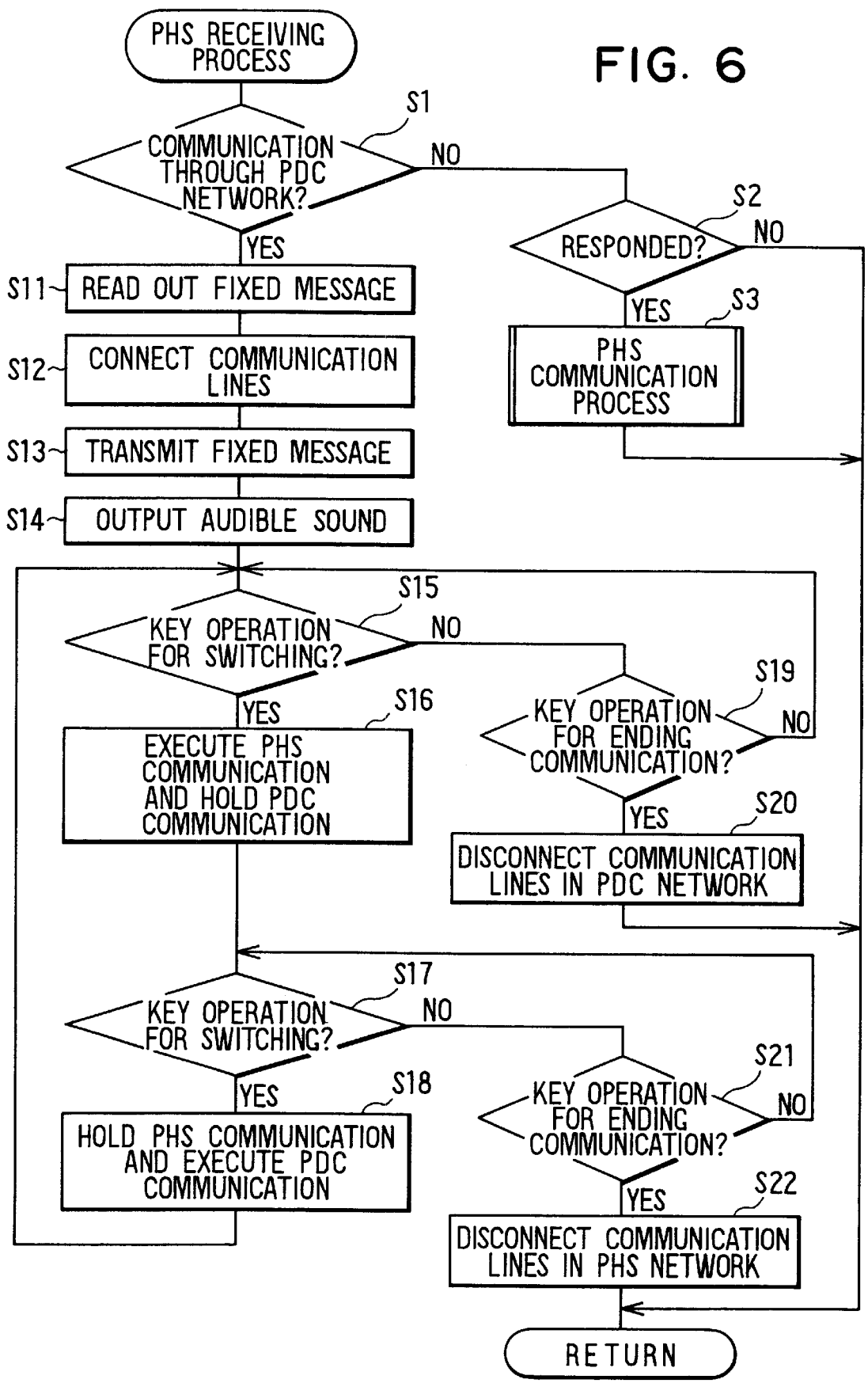
FIG. 6 is a flow diagram showing a communication control program of the communication device used in the second embodiment.

In the second embodiment shown in FIGS. 5 and 6, the main controller 2 of the PDC/PHS phone 1 is programmed to selectively switch its communication state from the PDC phone 19 to the PHS phone 23 or vice versa.

That is, the main controller 2 is programmed to operate as shown in FIG. 6 when it receives a call through the PHS network 25. If the main controller determines YES at step S1 indicating that the PDC/PHS phone 1 is in communication through the PDC network 21 when a call through the PHS, it produces to the memory 12 the message request signal and reads out the fixed message "It is in communication now. Please hold the line." at step S11. The main controller 2 causes the PHS communication part 6 to be connected to the PHS network 25 at step S12, and then transmits the fixed message at step S13 so that the fixed message is sent to the PHS phone 23 through the PHS network 25.

The main controller 2 further causes at step S14 the PDC/PHS processor 9 to drive the speaker 15 to produce an audible sound of a fixed frequency in a predetermined sound pattern. Thus, the user of the PDC/PHS phone 1 is enabled to recognize that a call was received through the PHS network 25 even in the communication through the PDC network 21.

The main controller 1 then checks at step S15 whether the user operated keys (for instance, "communication start" key) to switch a communication network from the PDC network 21 to the PHS network 25. If the check result at step S15 is YES, the main controller 2 produces the control signal to both PDC communication part 3 and PHS communication part 6 at step S16 to enable a new communication with the PHS phone 23 through the PHS network 25 and hold the existing communication with the PDC phone 19 through the PDC network 21. Thus, the user of the PDC/PHS phone 1 is capable of responding to the call from the PHS phone 23 with his/her own message.

The main controller 2 further checks at step S17 whether the user operated the key ("communication start" key) again to switch back communication network from the PHS network 25 to the PDC network 21. If the check result at step S17 is YES, the main controller 2 produces the control signal to both PDC communication part 3 and PHS communication part 6 at step S18 so that the PDC/PHS phone 1 is connected to the PDC network 21 to resume the held communication with the PDC phone 19 and is disconnected from the PHS phone 23 to hold the communication with the PHS phone 23. Thus, the user of the PDC/PHS phone 1 is capable of resuming the temporarily interrupted communication with the PDS phone 19.

If the check result at step S15 is NO indicating that no keys were operated, the main controller 2 checks at step S19 whether another key (for instance, "communication end" key) was operated to terminate the communication with the PDC phone 19. If the check result at step S19 is YES, the main controller 2 causes at step S20 the PDC network part 3 to produce a disconnection signal to the PDC network 21. Thus, the PDC/PHS phone 1 is disconnected from the PDC communication network 21 so that the PDC/PHS phone 1 is enabled to communicate with the PHS phone 23.

Further, if the check result at step S17 is NO indicating that the key ("communication end") for switching the network is not operated, the main controller 2 checks at step S21 whether the user operated a key ("communication end" key) to terminate the communication with the PHS phone 23. If the check result at step S21 is YES, the main controller 2 causes at step S22 the PHC network part 6 to produce a disconnection signal to the PHS network 21. Thus, the PDC/PHS phone 1 is disconnected from the PHS communication network 21 so that the PDC/PHS phone 1 is enabled to resume the communication state with the PDC phone 23.

According to the second embodiment, in addition to the advantages provided in the first embodiment, the user of the PDC/PHS phone 1 is enabled to selectively switch the communication state by operating keys on the key pad 17 to start a new communication while holding the existing communication and to resume the held communication after terminating the new communication.

Other Embodiments

The present invention may be implemented in many other ways.

For instance, the wireless communication devices are not limited to the cellular phones but may be car phones. The communication parts are not limited to the PDC communication type and the PHS communication type, but may be a communication part which operates under a protocol of an analog cellular type. The communication parts are not limited to operate under protocols of TDMA (time-divided multiple access) and FDMA (frequency-divided multiple access), but may operate under a protocol of CDMA (code-divided multiple access).

The PDC communication part is not limited to operate in 1.5 GHz frequency band which complies with the PDC communication protocol, but may be constructed to operate in other frequency bands, for instance, 800 MHz band, as long as it complies with the PDC communication protocol. The PDC antenna and the PHS antenna are not limited to a separate type, but may be a combined type which operates as the PDC antenna and the PHS antenna.

The speaker which is used as an indicator to inform a reception of a call may be replaced with a display or a vibrator as long as it is capable of indicating the reception of a call. The fixed answer message is not limited to the preliminarily stored one, but may be changed freely by users or may be selected freely from a plurality of preliminarily stored ones by users.

Further modifications and alterations are also possible without departing from the spirit of the invention.

What is claimed is:

1. A wireless communication device for a plurality of communication systems operable independently of each other under different communication protocols, the device comprising:

a memory storing therein a fixed message;

a plurality of communication parts connectable to the communication systems to receive calls therefrom; and a controller programmed to detect which one of the communication parts received a call in the middle of a communication through another of the communication systems, to further connect the detected communication part to one of the communication systems through which the call is received, and to transmit the fixed message in the memory to the connected communication system through the detected communication part in the middle of the communication through the another of the communication systems.

2. A wireless communication device of claim 1, wherein:

the fixed message includes a request of sending a reply message in return of the fixed message; and the controller is further programmed to store the reply message in the memory means.

3. A wireless communication device of claim 1, further comprising:

an indicator for indicating a reception of the call; and a key operation detector for detecting a key operation, wherein the controller is programmed to enable a transmission of the fixed message to the connected communication system only when the indicator is driven to indicate the reception of the call and the detected key operation is a predetermined one for a fixed message transmission.

4. A wireless communication device of claim 3, wherein:

the controller is further programmed to switch a connection of the communication parts to the communication systems when the detected key operation is another predetermined one for a communication part switching, so that a communication through one of the one communication part and the another communication part is enabled while holding the other of the one communication part and the another communication part.

5. A wireless communication device of claim 4, wherein:

the controller is further programmed to terminate the communication through the one of the one communication part and the another communication part, when the key operation is a further predetermined one for terminating an enabled communication.

6. A method of operating a wireless communication device which is compatible with a plurality of communication systems operable independently of each other under different communication protocols, the method comprising:

checking, when a call is received through one communication system, whether the communication device is in communication through another communication system;

reading out a fixed message from a memory in response to a check result indicating a communication through the another communication system;

outputting an indication of a reception of the call from the one communication system; and transmitting the fixed message to the one communication system through one communication part of the communication device operable with a same protocol as that of the one communication system.

7. A method of claim 6, further comprising:

checking whether a predetermined key operation on the communication device is made in response to the indication of the reception of the call; and enabling a transmission of the fixed message only when the predetermined key operation is detected.

8. A method of claim 6, further comprising:

checking whether a predetermined key operation on the communication device is made in response to the indication of the reception of the call; and switching a connection of the communication device from the another communication system to the one communication device for communication through the one communication system.

* * * * *